United States Patent
Miserque et al.

(10) Patent No.: US 7,282,544 B2
(45) Date of Patent: Oct. 16, 2007

(54) OLEFIN POLYMERISATION PROCESS IN THE PRESENCE OF AN ANTI-FOULING AGENT

(75) Inventors: Olivier Miserque, Mont-Saint-Guibert (BE); Kal Hortmann, Dilbeek (BE); Pascal Folie, Courcelles (BE); Renaud Oreins, Wavre (BE)

(73) Assignee: Total Petrochemicals Research Feluy, Feluy (BE)

( * ) Notice: Subject to any disclaimer, the term of this patent is extended or adjusted under 35 U.S.C. 154(b) by 0 days.

(21) Appl. No.: 11/503,345

(22) Filed: Aug. 9, 2006

(65) Prior Publication Data

US 2007/0049709 A1    Mar. 1, 2007

(51) Int. Cl.
*C08F 2/04* (2006.01)
*C08F 10/06* (2006.01)

(52) U.S. Cl. ............... 526/74; 526/64; 526/351

(58) Field of Classification Search .......... 526/64, 526/74, 351
See application file for complete search history.

(56) References Cited

U.S. PATENT DOCUMENTS 5,929,179 A * 7/1999 Strobbe et al. ............... 526/64
6,916,892 B2 * 7/2005 Tharappel et al. .......... 526/113

FOREIGN PATENT DOCUMENTS

EP    1316566    4/2003

* cited by examiner

*Primary Examiner*—Fred Teskin
(74) *Attorney, Agent, or Firm*—William D. Jackson

(57) ABSTRACT

A propylene polymerisation process carried out in the presence of an anti-fouling agent; characterised in that the anti-fouling agent comprises an anti-fouling polymer containing:

(1) one or more blocks —$(CH_2—CH_2—O)_k$— where each k is in the range from 1 to 50; and
(2) one or more blocks —$(CH_2—CH(R)—O)_n$— where R comprises an alkyl group having from 1 to 6 carbon atoms and each n is in the range from 1 to 50;

and terminated by a R' and a R" end groups wherein R' is OH or an alkoxy having from 1 to 6 carbon atoms and R" is H or an alkyl having from 1 to 6 carbon atoms, and the anti-fouling polymer is solvated in a solvent comprising cyclohexane when added to the polymerisation medium.

20 Claims, 3 Drawing Sheets

OLEFIN POLYMERISATION PROCESS IN THE PRESENCE OF AN ANTI-FOULING AGENT

The present invention concerns a new olefin polymerisation process for preventing fouling in the polymerisation reactor. The invention concerns propylene polymerisation processes using a metallocene-type catalyst, or Ziegler Natta-type catalyst.

Olefin polymerisation processes are well known. Among the processes, slurry polymerisation in suspension in a solvent or in the liquid monomer is extensively practiced. Such processes are performed in a stirred tank reactor, or in closed loop reactors. One or more reactors can be used. In such processes, solid polymer particles are grown on small catalyst particles. Released heat of polymerisation is eliminated through cooling through the reactor's walls and/or a heat exchanger.

However, it has been found on an industrial scale that while the polymer particles are insoluble or substantially insoluble in the diluent, the polymer product has some tendency to deposit on the walls of the polymerisation reactor. This so-called "fouling" leads to a decrease in the efficiency of heat exchange between the reactor bulk and the coolant around the reactor. This leads in some cases to loss of reactor control due to overheating, or to reactor or downstream polymer processing equipment failure due to formation of agglomerates (ropes, chunks).

This "fouling" is caused in part by fines and also by the build up of electrostatic charge on the walls on the reactor. Attempts to avoid fouling during slurry polymerisation have been made by adding an antifouling agent in the polymerisation medium. Typically, the antifouling agent acts for example to make the medium more conductive, thus preventing to some extent the formation of electrostatic charge, which is one cause of the build-up of polymer on the wall of the reactor.

U.S. Pat. No. 3,995,097 discloses a process whereby an olefin is polymerised in a hydrocarbon diluent using a catalyst comprising chromium oxide associated with at least one of silica, alumina, zirconia, or thoria. Fouling of the reactor is said to be reduced by adding a composition, which comprises a mixture of aluminium or chromium salts of an alkyl salicylic acid and an alkaline metal alkyl sulfosuccinate. It is said that it is desirable to dissolve the anti-fouling composition in a hydrocarbon solvent, such as n-decane. Further, it is said that paraffins of 9 to 20 carbon atoms are the preferred solvents, although naphthenic solvents also are mentioned.

EP 0,005,215 is concerned with a process for polymerising olefins in a hydrocarbon diluent again using a catalyst comprising calcined chromium compound associated with at least one of silica, alumina, zirconia or thoria or using a catalyst system such as those disclosed in U.S. Pat. Nos. 2,908,671, 3,919,185 and 3,888,835. The process uses an anti-fouling agent comprising a compound containing a sulphonic acid residue. The anti-fouling agent is a composition comprising (a) a polysulphone copolymer (b) a polymeric polyamine, and (c) an oil soluble sulphonic acid. It is mentioned that the solvent for the anti-fouling additive can be the same material used as the diluent in the polymerisation reaction or it can be different, so long as it does not interfere with the polymerisation reaction. In the Example, the additive product known as STADIS 450 (in toluene) is used as the anti fouling agent.

U.S. Pat. No. 6,022,935 (equivalent to EP 0,803,514) discloses a process for the preparation of polymers of $C_2$-$C_{12}$ alk-1-ene using a catalyst system containing a metallocene complex. An antistatic agent is used in the process. It is said that in general, all antistatic agents which are suitable for polymerisation may be used. Examples given are salt mixtures comprising calcium salts of medialanic acid and chromium salts of N-stearylanthranilic acid, $C_{12}$-$C_{22}$ fatty acid soaps of sulfonic esters of the general formula (RR')—CHOSO$_3$Me, esters of polyethylene glycols with fatty acids, and polyoxyethylene alkyl ethers. STADIS 450 also is mentioned. The antistatic agent is preferably used in solution.

EP 0,820,474 is concerned with preventing sheeting problems in gas phase reactors in polymerisation processes, which comprise at least one loop reactor followed by at least one gas phase reactor. These problems are addressed using a fouling preventive agent that is a mixture of Cr salt of $C_{14}$-$C_{18}$ alkyl-salicylic acid, a Ca dialkyl sulphosuccinate and a copolymer of alkylmethacrylate with 2-methyl-5-vinylpyridine in solution in xylene. Chromium-type catalysts, Ziegler-type catalysts and metallocene catalysts are mentioned. In the examples, the fouling prevention agent used is the commercial product TOLAD 511 in propane or ASA 3 (in xylene).

JP 2000-327,707 discloses a slurry olefin polymerisation method. The method addresses the problem of fouling and sheeting of the reactor wall, which is observed particularly when the catalyst is a supported metallocene catalyst. The method is said to be carried out in the presence of one compound chosen from polyalkylene oxide alkyl ether, alkyl diethanolamine, polyoxyalkylene alkyl amine, and polyalkylene oxide block. The chosen compound is used in the liquid form.

The anti-fouling agents disclosed in JP 2000-327,707 generally may be considered as polymeric viscous products. Their viscosity (in the region of a Brookfield viscosity of about 1200cps) makes the anti-fouling agent difficult to pump.

It is possible to reduce viscosity by heating the agent and work has been done in the past to pump heated anti-fouling agent to solve this problem. However, the present inventors have found that this in fact is technically complicated and causes some security concerns.

EP 1,316,566 discloses propylene polymerisation in a bulk loop reactor. The disclosure is concerned specifically with the transition from one catalyst type to another in a bulk loop reactor and with problems associated therewith. The process involves injecting a metallocene catalyst and a Ziegler-Natta catalyst into the bulk loop reactor. It is mentioned on page 3 paragraph [0009] that in one embodiment, a volume of antifouling agent may be introduced at or downstream of a point of contact of a stream of propylene with a stream of catalyst. The antifouling agent is used in liquid form. According to the disclosure of EP 1,316,566 any antifouling agent would not at any stage be solvated in a solvent comprising cyclohexane.

In view of the above, it will be seen that many so called anti-fouling agents for use in various olefin polymerisation processes are known. However, there have been some problems associated with prior known agents. An increase of catalyst consumption due to loss of activity in the presence of the anti-fouling agent is observed, even at the low levels typically used in the polymerisation process. Catalyst activity loss is linked to the poisoning of active sites, for example by the polar moieties of the anti-fouling agent (alcohol and sulphonate . . . ). Other problems with prior known agents relate to problems of toxity. This is a particular concern with Cr-based anti-fouling agent or with agents such as commercial Stadis 450 as described in EP 0,005,215, because of its toluene (as solvent) and active ingredient content.

Also, practical problems are encountered with many previously known anti-fouling agents. These practical problems arise because some antifouling agents are usable only with a given catalyst type. This makes transitions between catalyst systems during processing more difficult.

A further problem arises for a propylene polymerisation process. This is because it is not desirable for the propylene monomer to be used as a suspension medium for the anti-fouling agent, because, in these circumstances, the viscosity means that the liquid is too difficult to pump. The viscosity is important because this affects the ease of pumping the liquid. Further, the concentration of the pumped liquid affects the accuracy of pumping and also problems relating to pressure. With regard to the accuracy of pumping, it will be understood that a degree of error of, for example, plus or minus 0.5 on a solution of concentration that is pumped at a rate of 1 litre per hour has more effect than on a solution that is pumped at a rate of 5 litres per hour, where the same quantity of anti-fouling agent is pumped per hour in each case.

In this sense, there remains a particular need to provide new anti-fouling agents for use in propylene polymerisation processes where it is not desirable for the propylene monomer to be used as a suspension medium for the anti-fouling agent.

The present inventors have identified that a solvated anti-fouling agent may solve this problem.

There is however a technical prejudice against using a solvent since the introduction of a further material into the polymerisation medium can affect the reaction and the end product and generally is to be avoided.

To this end, the present inventors identified and took into consideration several desirable so-called results to be achieved when trying to provide a solvated anti-fouling agent. Firstly, a "light" solvent was needed, that was easy to remove from the polymer product. Secondly, the solvent had to be free of toluene or aromatics for safety reasons. Thirdly, the solvent had to sufficiently dissolve the antifouling agent. The antifouling agent is generally viscous and needs to be dissolved in order to improve the spraying accuracy. Finally, there had to be ease of separation of the monomer and the polymer product from the solvent.

This problem now has been solved at least partially by the provision of a propylene polymerisation process carried out in the presence of an anti-fouling agent; characterised in that the anti-fouling agent comprises an anti-fouling polymer containing:

(1) one or more blocks —$(CH_2—CH_2—O)_k$— where each k is in the range from 1 to 50; and (2) one or more blocks —$(CH_2—CH(R)—O)_n$— where R comprises an alkyl group having from 1 to 6 carbon atoms and each n is in the range from 1 to 50;

and terminated by R' and R" end groups, wherein R' is OH or an alkoxy having from 1 to 6 carbon atoms and R" is H or an alkyl having from 1 to 6 carbon atoms, and the antifouling polymer is solvated in a solvent comprising cyclohexane when added to the polymerisation medium.

In the present process, $(CH_2CH(R)O)_n$ blocks generally may be considered to be lipophilic whereas $(CH_2CH_2O)_k$ blocks may be considered to be hydrophilic. Preferably, one end of the polymer is hydrophilic and the other end or the middle of the polymer is lipophilic.

Such a polymer as contained in the present anti-fouling agent is known per se, particularly outside the field of olefin polymerisation. In this regard, such a polymer is known as a lubricant or washing detergent.

However, it has been surprisingly found by the present inventors that such a polymer may be used advantageously in a propylene polymerisation method when in a solvent comprising cyclohexane. The very good solubility of such a polymer as described above in cyclohexane was unexpected. In one embodiment, a "perfect" solubility of polymer in cyclohexane at room temperature was determined. In addition, the selection of cyclohexane also fulfils the low toxicity and the easy removal requirements.

The diluted polymer has reduced viscosity. This makes it easier to pump, especially in the small quantities generally used in the method. Further, it will be appreciated that cyclohexane avoids the safety problems that are associated with some other solvents such as toluene and aromatics, which hitherto have been widely used as solvents for anti-fouling agents.

Furthermore, it has been found that improved activity or at least no loss of activity occurs in the present process as compared with an equivalent process which uses Stadis 450 in toluene as the anti-fouling agent. This means that the present method suitably can be used in an olefin polymerisation process carried out in the presence of any one or more of a metallocene-type catalyst, a late transition-metal type catalyst or a Ziegler-Natta type catalyst. This is particularly advantageous since, for logistical reasons, it is preferable to be able to use a single anti-fouling agent in olefin polymerisation processes regardless of the type of catalyst. This is however not possible with most previously known anti-fouling agents without loss of activity with one of the catalyst types.

Preferably, the polymer in the present anti-fouling agent is diluted to a concentration of from 10 to 20 wt %. The optimum concentration can be obtained by balancing the advantages of a lower viscosity and a less concentrated liquid against the disadvantages associated with the introduction of a large volume of a solvent.

It will be understood in the present process that, where necessary, an activating agent will be needed to activate the catalyst or to modify the product polymer properties. Suitable activating agents, where needed, are well known in this art. Suitable activating agents include organometallic or hydride compounds of Group I to III, for example those of general formula $AlR_3$ such as $Et_3Al$, $Et_2AlCl$, and $(i-Bu)_3Al$. One preferred activating agent is triisobutylaluminium.

Where the polymerisation process is a slurry polymerisation process, typically, the polymerisation process will be carried out in suspension in the bulk liquid propylene monomer. A separate catalyst diluent may be required.

The anti-fouling agent may be added at any suitable stage in the process. The addition can be carried out continuously or batch wise. The solvated anti-fouling polymer may be added to the polymerisation medium separately or may be mixed with the propylene monomer and then added to the polymerisation medium.

Advantageously, the solvated anti-fouling agent may be added via the monomer header in order to introduce the agent evenly in the reactor.

The anti-fouling agent desirably is liquid at room temperature and, as such, the anti-fouling polymer is liquid at room temperature. There are two principle factors, which determine whether the anti-fouling polymer is liquid at room temperature. These are: the molecular weight of the anti-fouling polymer and the wt% ethylene oxide in the anti-fouling polymer.

Preferably, the wt % ethylene oxide in the anti-fouling polymer is in the range of from 5 to 40 wt %, more preferably from 8 to 30 wt %, even more preferably from 10 to 20 wt %, most preferably about 10 wt %.

Further, the anti-fouling polymer preferably has a molecular weight (MW), not higher than 5000. In order to avoid any poisoning effect on the catalyst and to minimise elution of residues from the formed polymer product, the molecular weight is greater than 1000 Daltons, preferably greater than 2000 Daltons, more preferably in the range from 2000-4500 Daltons.

It will be understood from the above that in order to ensure that the anti-fouling polymer is liquid at room temperature, one must balance the molecular weight of the anti-fouling polymer and the wt % ethylene oxide in the anti-fouling polymer. It is to be noted that the activity of the anti-fouling polymer decreases as the molecular weight increases. Therefore, in practice, it may be desirable to increase the wt % ethylene oxide in the anti-fouling polymer in order to ensure that the solvated anti-fouling agent is liquid at room temperature, rather than increase the molecular weight of the anti-fouling polymer.

It will be appreciated from the above that the molecular weight of the anti-fouling polymer should be selected in combination with the wt % ethylene oxide content in the anti-fouling polymer. For guidance value, the present inventors have found that an anti-fouling polymer having an ethylene oxide content of 10 wt % and a molecular weight in the range of from 4000 to 4500 is particularly useful in the present process.

Cyclohexane has a high freezing point (6.5° C.) and a solution of the present anti-fouling polymer in cyclohexane may freeze at about 0° C. In view of this, during cold weather it is desirable in the present process to use a mixture of solvents in the anti-fouling agent. Where a mixture of solvents is used, the mixture of solvents comprises cyclohexane and another solvent which serves to lower the freezing point of the anti-fouling agent.

Preferably, the another solvent lowers the freezing point without substantially reducing the solubility of the anti-fouling agent in the solvent. To this end, preferably, the other solvent is selected from the group consisting of linear hexane, branched hexane, linear pentane, branched pentane, cyclopentane, and mixtures thereof. More preferably, the other solvent is selected from the group consisting of branched hexane and branched pentane. Branched hexane and branched pentane are preferred for safety reasons. Isohexane is particularly preferred. As such, the mixture of solvents preferably comprises cyclohexane and isohexane. This advantageously serves to lower the freezing point of the anti-fouling agent in solution, without reducing solubility.

Preferably, the mixture of solvents contains cyclohexane and up to about 15 wt % of the another solvent, preferably from 8 to 15 wt %, most preferably about 10 wt %.

Generally, the anti-fouling polymer is used at the lowest possible concentration effective to prevent or substantially reduce fouling. This can be determined by routine experimentation. Preferably it is used at a concentration of from 0.5 to 20 ppmw in the polymerisation medium, more preferably from 2 to 10 ppmw.

Preferably, the anti-fouling polymer is a block polymer, more preferably a triblock polymer.

Preferably, the anti-fouling polymer is a block polymer of general formula:

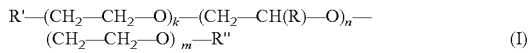

$$R'—(CH_2—CH_2—O)_k—(CH_2—CH(R)—O)_n—(CH_2—CH_2—O)_m—R'' \quad (I)$$

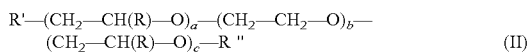

$$R'—(CH_2—CH(R)—O)_a—(CH_2—CH_2—O)_b—(CH_2—CH(R)—O)_c—R'' \quad (II)$$

where R comprises an alkyl group; R' and R" are end groups; k is from 1 to 50; n is from 1 to 50; m is greater than or equal to 1; a is from 1 to 50; b is from 1 to 50; and c is from 0 to 50. k and m may be the same or different.

Preferably R is a C1 to C3 alkyl group. More preferably, R is a methyl group. Preferably, in one embodiment, k is greater than 1 and m is greater than 1. Also preferably, in another embodiment a is 0 or c is 0.

Preferred R' and R" groups include H; OH; alkyl, and alkoxy groups. Preferred alkyl groups are C1 to C3 alkyl groups. Preferred alkoxy groups are C1 to C3 alkoxy groups. In this regard, as mentioned above, the ends of the polymer should be hydrophilic. Therefore, in formulae (I) and (II) above, it is preferred that R' is OH or an alkoxy group, preferably OH or a C1 to C3 alkoxy group. Further, it is preferred that R" is H or an alkyl group, preferably H or a C1 to C3 alkyl group.

A particularly preferred anti-fouling polymer has general formula (III):

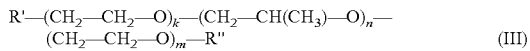

$$R'—(CH_2—CH_2—O)_k—(CH_2—CH(CH_3)—O)_n—(CH_2—CH_2—O)_m—R'' \quad (III)$$

where R', R", k, n, and m independently are as defined anywhere above in relation to formulae I and II.

A further preferred anti-fouling polymer has general formula (IV):

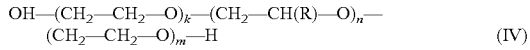

$$OH—(CH_2—CH_2—O)_k—(CH_2—CH(R)—O)_n—(CH_2—CH_2—O)_m—H \quad (IV)$$

where R, k, n, and m independently are as defined anywhere above.

It will be appreciated that, by virtue of the preferred molecular weights for the present anti-fouling polymer and the preferred ethylene oxide contents in the present anti-fouling polymer given above, preferred values for a, b, c, k, n, and m can be derived.

The present process may be used to make a propylene homopolymer or copolymer or higher order polymer. Where the present process is used to make a propylene copolymer or higher order polymer, preferred comonomers include ethylene and butylene. The copolymer or higher order polymer may be in a random, alternating, or block configuration. Preferred copolymers include a propylene-ethylene copolymer and a propylene-butylene copolymer. A preferred terpolymer is a propylene-ethylene-butylene terpolymer.

Where the copolymer or higher order polymer is in a block configuration, one way of making the polymer is to make the homopolymer "blocks" and, subsequently, to introduce these pre-made "blocks" into the polymerisation medium with a comonomer. Alternatively, the "block" polymer can be made in a polymerisation medium containing the propylene monomer with a small quantity of the comonomer.

A preferred reaction temperature range may be said to be from 40° C. to 110° C., more preferably from 50 to 90° C., most preferably from 60 to 80° C.

A preferred applied pressure range may be said to be from 5 to 200 barg, more preferably from 30 to 70 barg depending on the reactor configuration and on the diluent.

Generally, Ziegler-Natta type catalysts usable in the present process comprise a transition metal compound of Group IV-VIII (mainly Mg, Ti or V) supported or not on a carrier. Such catalysts are well known in the art. Examples of Ziegler-Natta catalysts are $TiCl_4$, $TiCl_3$, $VCl_4$, $VOCl_3$. Titanium chloride supported on a chlorinated Mg support or a chlorinated Mg/silica support is preferred.

Late transition metal catalysts usable in the present process include nickel complexes and iron complexes such as disclosed for example in Ittel et al. (S. T. Ittel, L. K. Johnson and M. Brookhaert, in Chem. Rev., 2000,1169.) and in Gibson and Spitzmesser (V. C. Gibson and S. K. Spitzmesser, in Chem. Rev., 2003,283.). Catalysts of this type will be well known to a person skilled in this art.

Generally, metallocene-type catalysts usable in the present process comprise an organometallic complex. A preferred metallocene-type catalyst is a complex of an organometallic compound and MAO.

In the present process, it is generally preferred that the process is carried out in the presence of a metallocene-type catalyst. It is further preferred that the metallocene-type catalyst is activated by tri isobutyl aluminium as the activating agent. It is also preferred that the metallocene-type catalyst is supported, desirably on a silica support.

Particularly preferred metallocene-type catalysts will be governed by the desired end product. In this regard, the skilled person will know certain preferred metallocene-type catalysts for preparing a syndiotactic polypropylene. For example, a metallocene-type catalyst having a general formula (1) is preferred for making a syndiotactic polypropylene:

$$R'(Cp)(Cp')MQ_p \qquad (1)$$

wherein Cp is a cyclopentadienyl group; Cp' is a fluorenyl group; R' is a structural bridge imparting stereorigidity to the catalyst; M is a metal atom from Group IV(b), V(b) or VI(b); and each Q is a hydrocarbyl group having from 1 to 20 carbon atoms or a halogen and p is the valance of M minus 2. Cp and Cp' may be substituted with the restriction that the substituents are selected to preserve Cs symmetry of the catalyst component. The skilled person would know the nature of preferred substituents.

Further, the skilled person would know the preferred number of substituents and the preferred positioning of any substituent.

The skilled person also will know suitable catalysts for making an isotactic polypropylene. For example, a catalyst of the general formula (2) is preferred for making an isotactic propylene:

$$(IndH_4)_2R'MQz \qquad (2)$$

wherein each Ind is the same or different and is substituted or unsubstituted indenyl or tetrahydroindenyl; R' is a bridge which imparts stereorigidity to the catalyst; M is a Group IV metal or vanadium; and each Q independently is a hydrocarbyl having 1 to 20 carbon atoms or halogen; Z is the valancy of M minus 2, and the substituents on the indenyls or tetrahydroindenyls, if present, are selected to impart C1 or C2 symmetry to the catalyst component.

One bulk reactor type which may be applied in slurry polymerisation processes is a turbulent flow reactor such as a continuous pipe reactor in the form of a loop. A continuous pipe reactor in the form of a loop is operated in liquid full mode, using liquid propylene as the liquid medium. Such a so-called loop reactor is well known and is described in the Encyclopaedia of Chemical Technology, 3$^{rd}$ Edition, Vol. 16 page 390.This can produce LLDPE and HDPE resins in the same type of equipment.

A loop reactor may be connected to one or more further reactors, such as another loop reactor. A loop reactor that is connected to another loop reactor may be referred to as a "double loop" reactor.

Other types of bulk reactors such as stirred tank reactors may be used instead of a loop reactor, again using the bulk monomer as the liquid medium. A stirred tank reactor also may be used in combination with a loop reactor, where a first reactor that is a loop reactor is connected to a second reactor that is a stirred tank reactor.

In some cases it may be advantageous for a gas phase reactor also to be incorporated. The gas phase reactor may be a second reactor that is connected to a first reactor such as a loop reactor or a stirred tank reactor. Alternatively, a gas phase reactor may be connected as a third reactor in the apparatus. In the gas phase reactor (if present), the elastomeric part of a copolymer or higher order polmer product may be produced. The elastomeric part of the polymer product gives impact properties to the product. The elastomeric part of the polymer product typically is comonomer rich.

The bulk reactor(s) may be connected to a gas phase reactor, for example where it is desirable to prepare a "block" polymer. For example, a "block" propylene-ethylene copolymer may be made by first polymerising propylene monomers in the bulk reactor. Optionally, there may be a small quantity of ethylene comonomers present.

The present invention now will be described in further detail with reference to the attached drawings in which.

The following embodiment describes apparatus that is useable in the present process, comprising at least two reactors where the first reactor is a loop reactor:

In the first reactor, the liquid propylene monomer polymerises in the presence of hydrogen, catalyst, activating agent, anti-fouling agent and optionally a comonomer.

Figure 1:
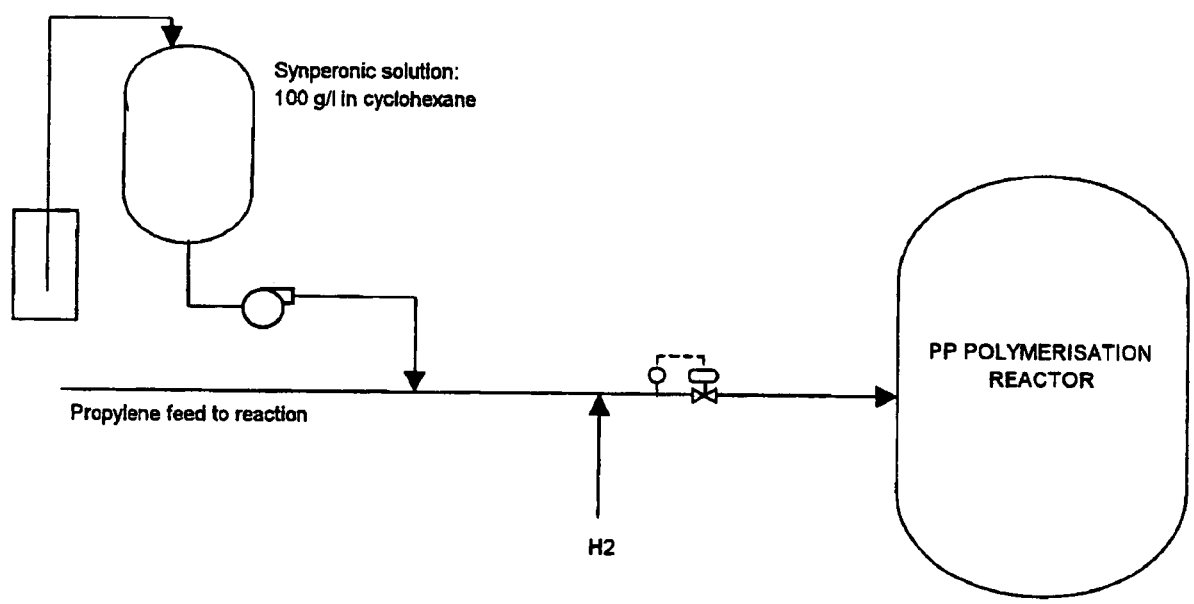
FIG. 1 shows a general scheme for the introduction of the antifouling agent into the polypropylene polymerisation reactor. Pumping is done with a metering pump.
Figure 2:
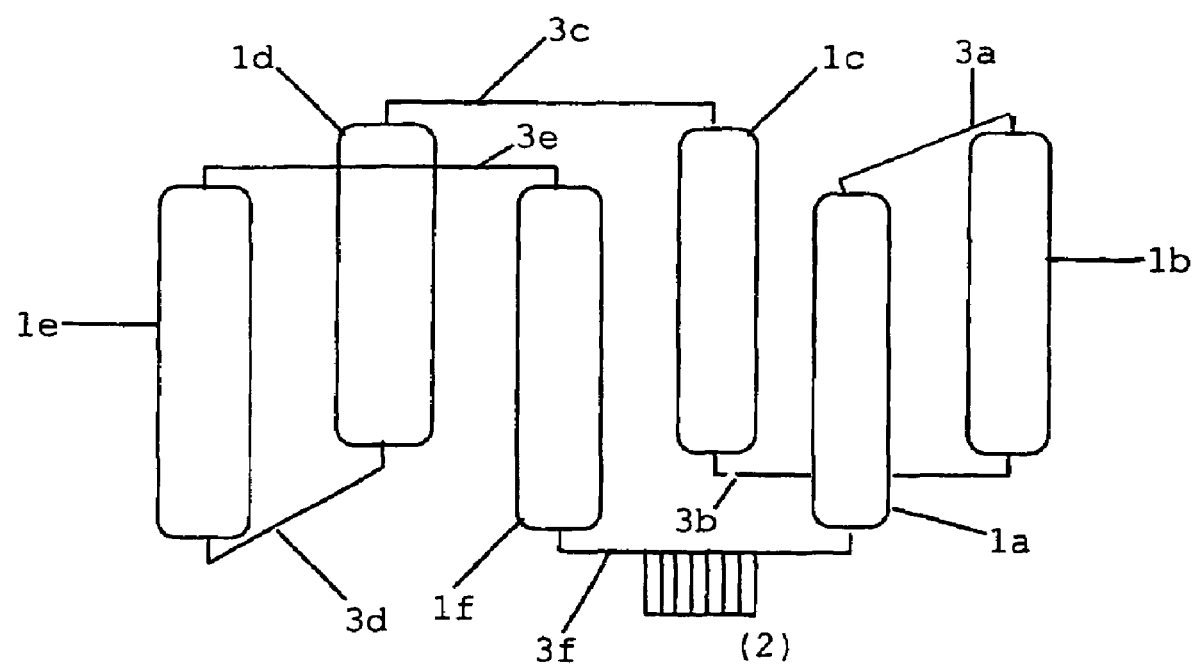
FIG. 2 shows a double loop reactor that is useable in the process according to the present invention.

The first reactor essentially consists of four or more vertical jacketed pipe sections (1a, 1b, 1c, 1d, 1e, 1f) connected by trough elbows (3a, 3b, 3c, 3d, 3e, 3f) as shown for example in FIG. 2 where there are six vertical jacketed pipe sections. There are three lower trough elbows in the reactor in FIG. 2 (3b, 3d, 3f) and three upper trough elbows (3a, 3c, 3e). The slurry is maintained in circulation in the reactor by an axial pump (2). The polymerisation heat may be extracted by water cooling jackets around the vertical pipe sections (legs). The reactants, diluent and antifouling agent conveniently are introduced into one of the lower trough elbows of the first reactor, close to the circulating pump. For example, in FIG. 2, this could be in the position marked "4".

The polypropylene product may be taken out of one or more of the lower trough elbows of the reactor, with some diluent. Typically, the product is removed from a different trough elbow to the trough elbow into which the reactants, diluent and antifouling agent are introduced. For example, in FIG. 2, when the reactants, diluent and antifouling agent are introduced at position "4", the product could be removed from trough elbow 3*b* or 3*d*.

The product from the first reactor then may be transferred to the second reactor. If the second reactor also is a loop reactor, the product from reactor 1, optionally further antifouling agent and further reactants conveniently are introduced into one of the lower trough elbows of the second reactor, close to the circulating pump. If a copolymer product is desired, a homopolymer reaction may be carried out in the first reactor and a copolymer reaction carried our in the second reactor. Suitable apparatus for such a process is shown in FIG. 20 on page 508 of the Encyclopaedia of Polymer Science and Engineering, Vol. 13, 1988.

In some embodiments it will be advantageous for the second reactor to be a gas phase reactor. Alternatively, where the second reactor is not a gas phase reactor, it may be advantageous for the apparatus to comprise a third reactor that is connected to the second reactor that is a gas phase reactor.

If the process is carried out using two reactors in series, the product of the first loop reactor collected through the slurry removal system is re-injected in the second reactor with additional diluent and monomer. If required, additional antifouling agent can also be added to the second reactor. A concentration of the slurry between the reactors can sometimes be performed, e.g. through the use of hydro-cyclone systems.

A continuous discharge system can be used.

Alternatively, slurry removal conveniently may be performed through settling legs and discontinuous discharge valves or slurry removal can be performed using a wash column or centrifuge apparatus.

Where slurry removal is performed through settling legs and discontinuous discharge valves, a small fraction of the total circulating flow is withdrawn.

After removal of the slurry from the reactor, the product is recovered. The product can be recovered using a variety of techniques including using a wash column. Alternatively, it may be moved to a polymer degassing section in which the solid content is increased. While being depressurised, the slurry may be degassed, e.g. during transfer through heated flash lines to a flash tank. In the flash tank, the product and diluent are separated. The degassing can be completed in a purge column.

The powder product is then further additivated and processed into pellets or additivated powder.

Experiments

Figure 3:
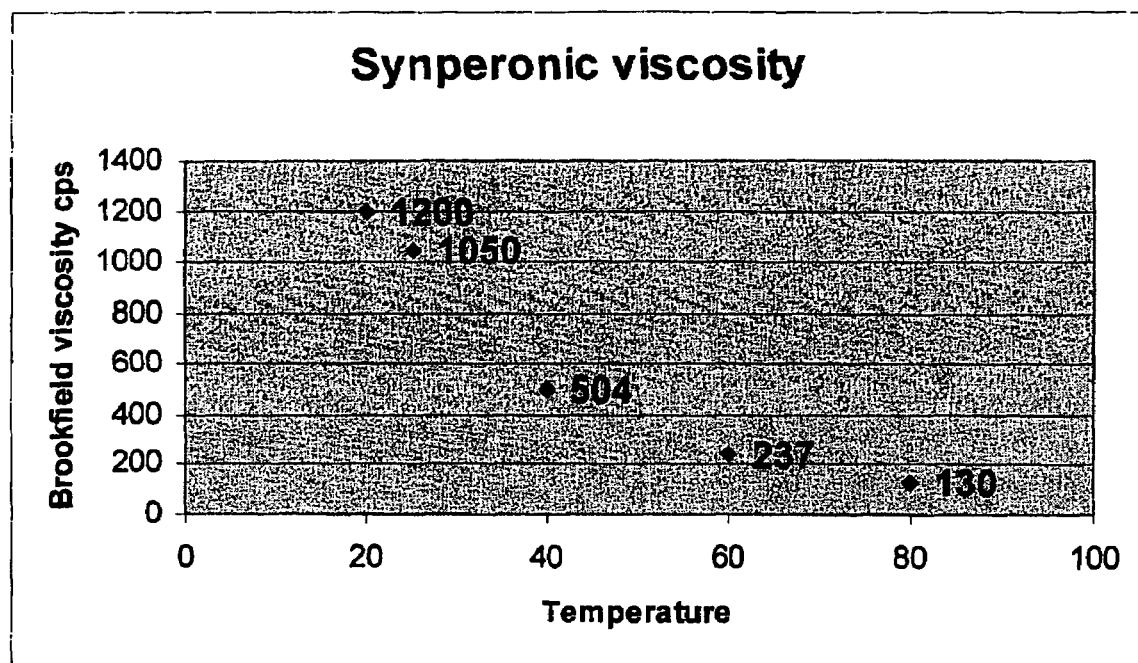
FIG. 3 represents the viscosity of synperonic experessed in cps as a function of temperature expressed in °C.

The polymerisation of polypropylene was carried out in a double loop reactor with a metallocene-base catalyst system. The synperonic has a very high viscosity that decreases with increasing temperature as can be seen in FIG. 3 that represents the synperonic viscosity expressed in cps as a function of temperature expressed in ° C. It was thus added as a solution of 19 wt % in cyclohexane in order to reduce the viscosity thereby enabling the solution to be pumped at room temperature (in the winter, it may be necessary to add a quantity of hexane of up to 10% in order to prevent the solution from freezing). The antifouling agent was added at a throughput that resulted in a concentration of 5 ppm in the reactor. The results are summarised in Table 1.

TABLE 1

| | units | |
|---|---|---|
| reactor throughput | t/hr | 30 |
| propylene feed | m³/hr | 100 |
| catalyst feed | kg/hr | 3 |
| synperonic feed | L/hr | 4 |
| operating time w/o reactor fouling | hr | 100 |

The invention claimed is:

1. A process for the polymerization of propylene comprising:
    a) introducing propylene and a polymerization catalyst into a polymerization reactor;
    b) operating said polymerization under conditions effective to polymerize propylene in the presence of said catalyst to produce a propylene polymer in a liquid polymerization medium;
    c) introducing into said polymerization medium an antifouling agent comprising a cyclohexane containing solvent having an anti-fouling polymer having
        i) at least one polymer block characterized by the formula —(CH$_2$—CH$_2$—O)$_k$— wherein k is within the range of 1-50; and
        ii) at least one polymer block characterized by the formula —(CH$_2$—CH (R)—O)$_n$— wherein R comprises an alkyl group having from 1-6 carbon atoms and n is within the range of 1-50;
    wherein said copolymer is terminated by end groups R' and R", R' is OH or a C$_1$-C$_6$ alkoxy group and R" is H or a C$_1$-C$_6$ alkyl group; and
    d) recovering a propylene polymer from said polymerization reactor.

2. The process of claim 1 wherein R is a methyl group.

3. The process of claim 1 wherein said anti-fouling polymer is liquid at room temperature.

4. The process of claim 1 wherein said solvent comprises a second solvent component selected from the group consisting of linear hexane, branched hexane, linear pentane, branched pentane, cyclopentane, and mixtures thereof.

5. The process of claim 4 wherein said second solvent component is present in said anti-fouling solvent in an amount within the range of 8-15 weight percent.

6. The process of claim 4 wherein said second solvent is branched hexane or branched pentane.

7. The process of claim 4 wherein said second solvent component is isohexane.

8. The process of claim 1 wherein said anti-fouling polymer has a molecular weight of at least 2,000 daltons.

9. The process of claim 1 wherein said anti-fouling polymer has a molecular weight within the range of 2,000-4,500 daltons.

10. The process of claim 1 wherein said anti-fouling polymer comprises a block copolymer characterized by formula (I) or (II):

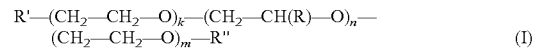

(I)

or

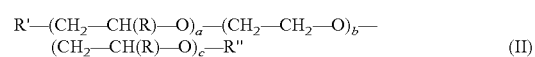

(II)

wherein R comprises an alkyl group; R' and R" are end groups as defined in claim 1; k is from 1 to 50; n is from 1 to 50; m≧1; a is from 1 to 50; b is from 1 to 50; and c is from 0 to 50.

11. The process of claim 10 wherein said anti-fouling polymer comprises a block copolymer characterized by formula (III):

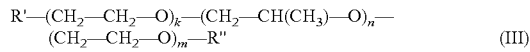

(III)

wherein R', R", k, n, and m independently are as defined in claim 10.

12. The process of claim 10 wherein the anti-fouling polymer comprises a block copolymer characterized by the general formula (IV):

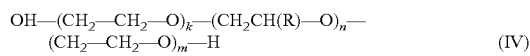

(IV)

where R, k, n, and m independently are as defined in claim 10.

13. The process of claim 1 wherein said reactor comprises a loop reactor.

14. The process of claim 13 wherein said reactor comprises a double loop reactor.

15. The process of claim 1 wherein said polymerization reactor is operated at a temperature within the range of 40° to 110° C.

16. The process of claim 15 wherein said reactor is operated at a pressure within the range of from 5 to 200 bars.

17. The process of claim 1 wherein said catalyst system comprises a metallocene catalyst component.

18. The process of claim 1 wherein propylene polymer is a homopolymer of propylene.

19. The process of claim 1 further comprising introducing at least one olefin comonomer into said reactor and recovering a copolymer of propylene and said comonomer.

20. The process of claim 1 wherein said anti-fouling polymer is present in said solvent at a concentration within the range of 10-20 weight percent.

* * * * *